(No Model.)
J. W. BOWEN & L. FLACK.
APPARATUS FOR CANNING FRUITS OR VEGETABLES.
No. 545,770. Patented Sept. 3, 1895.
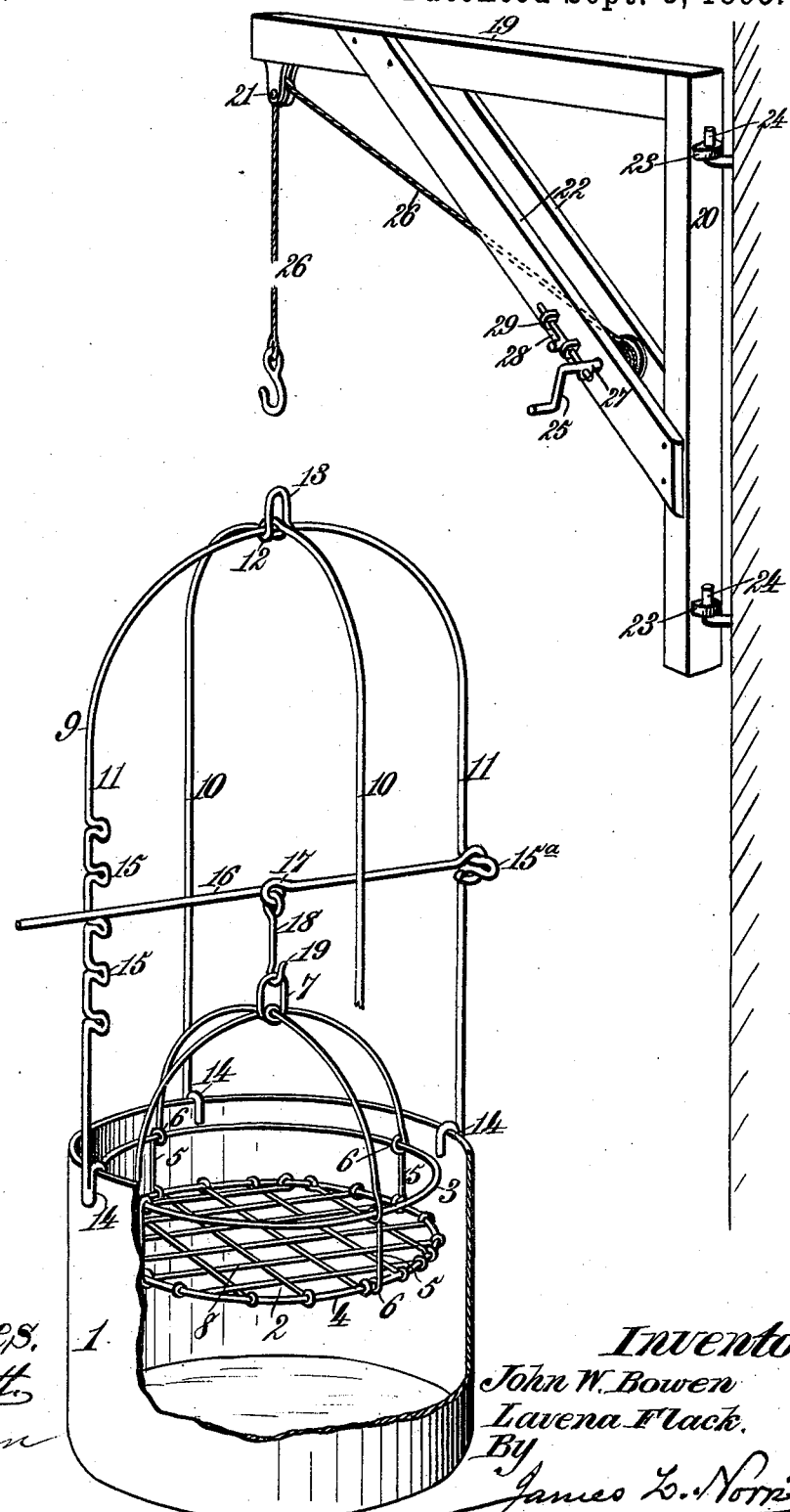
Witnesses.
Inventors.
John W. Bowen
Lavena Flack.
By James L. Norris.
Atty.

UNITED STATES PATENT OFFICE.

JOHN W. BOWEN AND LAVENA FLACK, OF SHARON, NORTH CAROLINA.

APPARATUS FOR CANNING FRUITS OR VEGETABLES.

SPECIFICATION forming part of Letters Patent No. 545,770, dated September 3, 1895.

Application filed June 3, 1895. Serial No. 551,549. (No model.)

*To all whom it may concern:*

Be it known that we, JOHN W. BOWEN and LAVENA FLACK, citizens of the United States, residing at Sharon, in the county of Cleveland and State of North Carolina, have invented new and useful Improvements in Apparatus for Canning Fruits or Vegetables, of which the following is a specification.

This invention relates to aparatus for canning fruits and vegetables, and has for its object to provide an inexpensive, efficient, and simple device, more especially adapted for domestic use, by means of which fruits, vegetables, and farm products generally may be canned with facility and at the expense of but slight labor; and to this end our invention consists in the novel features and in the construction or arrangement of parts hereinafter described, and pointed out in the claims following the description, due reference being had to the accompanying drawing, forming a part of this specification, in which is illustrated a perspective view of our improved apparatus.

In order that those skilled in the art may be enabled to make and use our invention, we will describe the same in detail, reference being had to the accompanying drawing, in which—

The numeral 1 indicates a boiler or kettle, which may be of any preferred or suitable size or shape. Adapted to be suspended within said boiler is a wire basket 2, preferably consisting of two hoops 3 and 4, arranged one above the other and secured together by wires 5, looped around said hoops, as at 6, the said wires at their upper ends being secured together and bent to form a loop 7, and to the bottom hoop 4 is secured a woven-wire bottom 8. Resting upon the upper edge of the boiler 1 is a basket-support 9, which is constructed of two rods 10 and 11, bent into substantially U shape and arranged at right angles to each other, said rods at their upper ends being united or secured together by twisting or bending one about the other, as at 12, the said twisted rod, as 10, being formed with a loop 13 at its junction with the other rod 11, for the purpose hereinafter described. The lower extremities of the rods 10 and 11 are bent up inwardly for a short distance and thence downwardly to form hooks 14, said hooks being adapted to engage and rest over the upper edge of the boiler 1, upon which the support 9 is seated. One side of the rod 11 of the support 9 is bent at equal distances apart to form laterally-projecting arms 15, and the other side is similarly bent to form a single rod 15ª, which constitutes a pivot upon which is journaled one end of a rod 16, which intermediate its ends is bent or doubled to form a loop 17, within which is fastened the upper end of a link 18. The lower end of the link 18 is hooked, as at 19, and is adapted to engage the loop 7 of the basket 2, by means of which the basket is held suspended within the boiler.

The operation of the device, as above described, is as follows: A suitable quantity of water having been placed within the boiler 1, and heat having been applied to the bottom of the boiler, the cans containing the fruit or vegetable to be treated are placed within the basket 2, and said basket is lowered down into the boiling water within the boiler 1 and is suspended upon the hooked end of the link 18, which depends from the rod 16, the free end of said rod 16 being placed upon one of the arms 15 to give the proper submergence to the cans placed within the basket. After the cans have remained in the boiling water the desired time the basket is removed from the boiler with the contained cans. The wire basket permits the boiling water to circulate freely about the cans, whereby the fruits or vegetables being treated are subjected to a uniform heat, and the means described for suspending the basket within the boiler permits of the cans being submerged to any depth within the boiler, as occasion may require.

In connection with apparatus of a large size, adapted to treat a large number of cans, we employ a hoisting apparatus for depositing and removing the basket from the boiler, constructed as follows: The numeral 19 indicates an arm secured at one end to a pintle 20 and provided at its other end with a pulley 21. The arm 19 is additionally supported by braces 22, fastened at their ends to said arm and pintle, and to the rear side of the latter are secured staples 23, which are adapted to be slipped over hooks 24, driven into any suitable or desired support. In the braces 22 is journaled a cranked-shaft 25, about which is wound a rope or chain 26, that passes over the pully 21, and at its end is fastened to the loop 13 on the support 9. In order that the winding shaft 25 may be locked against rotation, we form upon the same an eye 27, that is adapted to be engaged by a bolt 28, reciprocating in bearings 29, secured to one of the braces 22. By means of the hoisting apparatus described the basket and its support may be lowered within the boiler and hoisted out and swung from over the same with ease and dispatch, enabling a single operator to treat a large number of cans.

Having described our invention, what we claim is—

1. In a canning apparatus, the combination with a boiler, of a support 9 adapted to rest upon said boiler and provided with laterally projecting arms 15, a rod 16 pivotally secured at one end to said support and adapted at its free end to rest upon either of said arms, a link 18 suspended upon said rod, and a reticulated basket adapted to be hung upon said link, substantially as described.

2. In a canning apparatus, the combination with a boiler, of a support 9 adapted to be seated thereupon and provided with a series of laterally projecting arms 15, a rod 16 coiled intermediate its ends to form a loop 17 and at one end pivoted to said support and at its free end adapted to be supported upon the arms 15, a hooked link 18 suspended from the loop 17 and a reticulated basket adapted to be hung on said hooked link, substantially as described.

3. In a canning apparatus, the combination with a boiler, of a reticulated basket 2, a support 9 for said basket, consisting of U-shaped rods 10 and 11 united at their upper ends and provided at their lower ends with hooks adapted to fit over the edge of the boiler, and means for adjustably suspending said basket upon the said support, substantially as described.

4. In a canning apparatus, the combination with a boiler, of a reticulated basket 2, a support 9 for said basket consisting of two inverted U-shaped rods 10 and 11 arranged at right angles to one another and looped together at their upper ends, the lower ends of each of said rods being bent upward and then downward to form hooks adapted to engage the edge of the boiler, a rod 16 pivotally secured to one of said rods and adjustably and detachably secured to the opposite rod, and means for removably suspending said basket from said rod 16, substantially as described.

In testimony whereof we have hereunto set our hands in presence of two subscribing witnesses.

JOHN W. BOWEN.
LAVENA FLACK.

Witnesses:
E. L. HOLLAND,
S. B. JONES.